United States Patent [19]

Shepherd

[11] 4,447,770
[45] May 8, 1984

[54] PRECISION DRIVE SYSTEM

[75] Inventor: Orr Shepherd, Arlington, Mass.

[73] Assignee: Visidyne, Inc., Burlington, Mass.

[21] Appl. No.: 228,630

[22] Filed: Jan. 26, 1981

[51] Int. Cl.³ .............................................. G05B 5/01
[52] U.S. Cl. ................... 318/618; 318/649; 318/657; 318/616
[58] Field of Search ............... 318/649, 618, 657, 616, 318/626

[56] References Cited

U.S. PATENT DOCUMENTS

| | | | |
|---|---|---|---|
| 3,684,961 | 8/1972 | Muir | 318/656 |
| 3,851,238 | 1/1974 | Fletcher | 318/649 |
| 3,935,523 | 1/1976 | Clevland et al. | 318/618 X |
| 3,939,389 | 2/1976 | Nopper | 318/657 |
| 4,201,935 | 5/1980 | Fukuma | 318/626 |
| 4,221,995 | 9/1980 | Barkman | 318/616 |
| 4,331,910 | 5/1982 | Kohzai et al. | 318/618 |
| 4,341,986 | 7/1982 | Browder | 318/618 |
| 4,345,194 | 8/1982 | Green | 318/618 X |

Primary Examiner—B. Dobeck
Attorney, Agent, or Firm—Joseph S. Iandiorio

[57] ABSTRACT

A precision drive system including a base plate; track means and an air bearing means movable relative to one another, one of the means being fixed to the base plate and the other being movable for carrying an object to be moved relative to the base plate; means for moving one of the track and air bearing means; means for driving the moving means; and a control circuit including a power circuit for operating the means for driving; a velocity sensor for detecting the velocity of the movable one of the track and air bearing means, and a velocity feedback circuit for introducing velocity error signals into the power circuit to correct velocity; a position sensor to detect the position of the movable one of the track and air bearing means and a position feedback circuit for introducing position error signals into the power circuit to correct position.

7 Claims, 5 Drawing Figures

PRECISION DRIVE SYSTEM

FIELD OF INVENTION

This invention relates to a precision drive system, and more particularly to such a system for precisely moving a surface in an interferometer.

BACKGROUND OF INVENTION

In interferometer applications it is necessary to move one or more surfaces extremely smoothly and accurately to within a fraction of a wavelength. Typically, in interferometry the wavelengths are quite small, for example 6,000 Å. This is equivalent to 0.6 μm, or less than 0.000001 meter. Usually in an interferometer one of the mirrors is moved relative to the other by a carriage on tracks. There are thus two sources of error in mirror position. One is the tracks, the other the wheels, ball bearings, or other bearings which ride on the tracks. As a result of the typical mechanical tolerances of the track and bearings, there may occur sheer error, in which the mirror moves slightly in its own plane. Angular error may also occur, in which the mirror rotates about an axis in its own plane. Velocity error may also occur when there is non-uniform motion of the carriage and mirror along the tracks. Any deviation from flatness or smoothness in the tracks, or roundness or smoothness of the wheels or bearings, can cause one or more of these errors as the carriage moves along the tracks.

In order to avoid such errors, a step scan approach has been used in which the mirrors are moved in discrete steps, and measurements are taken only after the carriage has come to a complete stop. This, of course, eliminates velocity errors, as there is no movement when the data is taken. However, while such a technique is useful in laboratory environments, it is not practical in some other uses because it requires more time to start, step, stop and take data. It also still suffers from some sheer and angular errors, although these could be corrected after the carriage has stopped after each step.

Linear motor drives are used to drive carriages on ball bearings on tracks. While the linear motor drive does reduce velocity error, the tracks or ways require extremely close mechanical tolerances in order to eliminate other errors. In addition, linear motors, e.g. speaker coils, produce only relatively limited travel.

Another technique utilizes a flex-pivoted parallelogram structure in which flex-pivots made of tempered bands of metal twist up to approximately 15° without friction. This approach reduces velocity error but it introduces sheer error because the mirror must move vertically as well as laterally with the parallelogram action. In addition, such devices have limited travel and require fine adjustment of pivots to avoid angular error.

SUMMARY OF INVENTION

It is therefore an object of this invention to provide an improved, simple, inexpensive, precision drive system which substantially reduces sheer, rotational, and velocity errors.

It is a further object of this invention to provide an improved, simple, inexpensive precision drive system for an interferometer.

It is a further object of this invention to provide such a precision drive system which uses inexpensive, readily commercially available components.

This invention results from the realization that a highly precise and reliable drive for an interferometer or the like can be made using an air bearing driven by a precision lead screw and using both velocity feedback and position feedback to closely control velocity and position.

This invention features a precision drive system including a base plate, and track means and air bearing means movable relative to one another. One of the track means and air bearing means is fixed to the face plate, and the other is movable for carrying an object to be moved relative to the base plate. There are means for moving one of the tracks and air bearing means and means for driving the moving means. A control circuit includes a power circuit for operating the means for driving, and a velocity sensor for detecting the velocity of the movable one of the track and air bearing means. A velocity feedback circuit introduces velocity error signals into the power circuit to correct velocity. A position sensor detects the position of the movable one of the track and air bearing means, and a position feedback circuit introduces position error signals into the power circuit to correct position.

In a preferred embodiment, the means for moving includes a precision lead screw and drive nut. The precision lead screw may be engaged with the means for driving. The means for driving may include an electrical motor. The velocity sensor may include a tachometer for indicating speed of the precision lead screw, and the position sensor may include a linear variable differential transformer (LVDT) for indicating the position of the movable one of the tracks and air bearing means. Usually, the length of the engagement of the track and bearing means is approximately as long as or longer than the total movement distance required of the system.

DISCLOSURE OF PREFERRED EMBODIMENT

Other objects, features and advantages will occur from the following description of a preferred embodiment and the accompanying drawings, in which.

Figure 1:
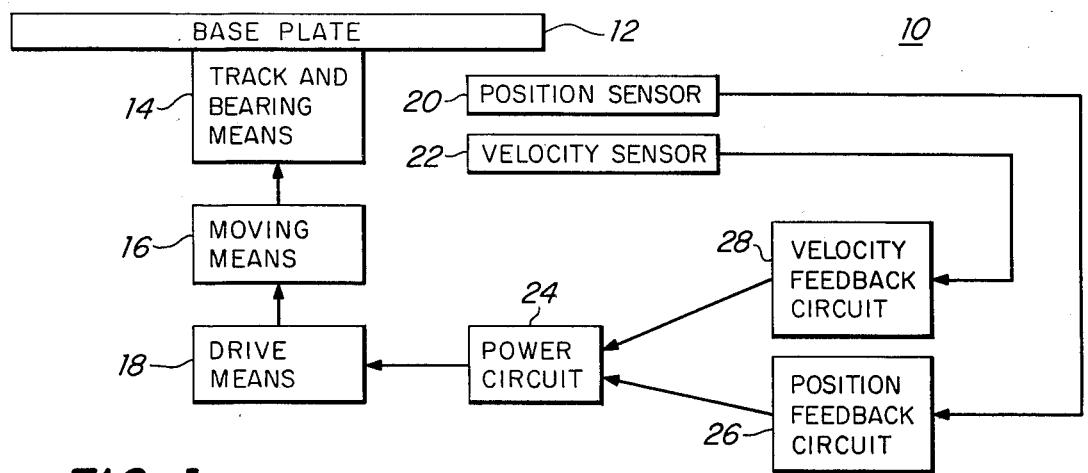
FIG. 1 is a block diagram of a precision drive system according to this invention.

There is shown in FIG. 1 a precision drive system 10 according to this invention, including a base plate 12 and track and bearing means 14, one of which, either the track or the bearing, is fixed to base plate 12 while the other is relatively movable. Base plate 12 may typically be the mounting base plate of an interferometer. Track and bearing means 14 may include a approximately 25 cm.-long Dover Instrument air bearing No. 400-B, which operates at typically 30 PSI. The movable one of the track and bearing means 14 is operated by moving means 16, which may include a precision lead screw such as a Precision Thread Grinding, Inc., precision lead screw No. A-11/76, approximately 20 cm. in length. Drive means 18 may include a Torque System servo motor/tachometer, No. 3210-023G. The position sensor 20 may include a Schaevitz Model No. 2000 DC-D linear-variable differential transformer (LVDT), and velocity sensor 22 may include a tachometer integral with the servo motor No. 3210-023G made by Torque Systems, referred to supra. Position sensor 20 and velocity sensor 22 detect the position and velocity of the moving portion of the system and relate it back to power circuit 24 through position feedback circuit 26 and velocity feedback circuit 28, respectively.

Figure 2:
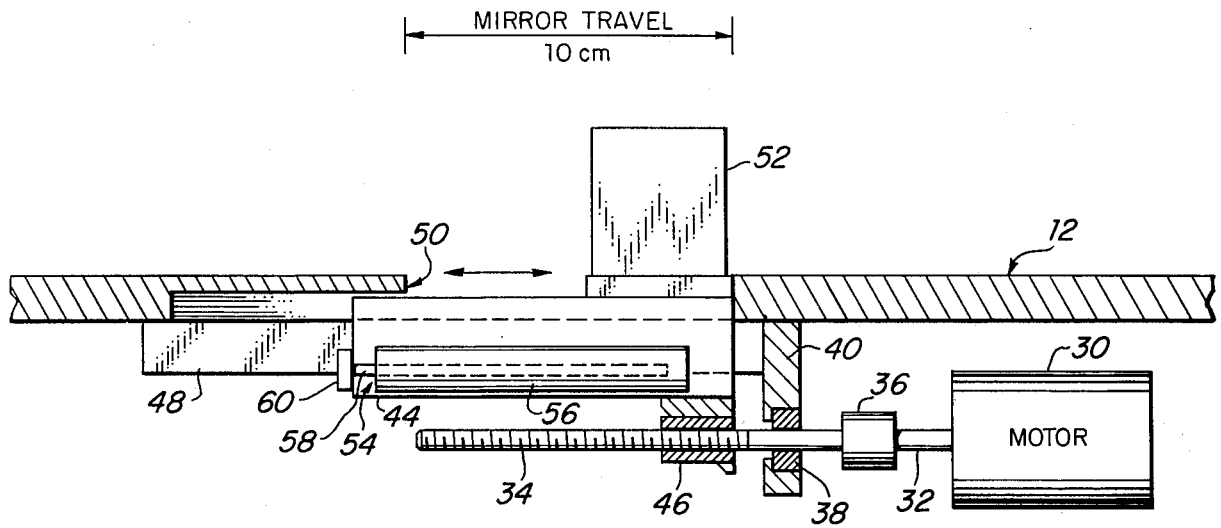
FIG. 2 is a schematic side elevational cross-sectional view of the base plate, track and bearing means, moving means, and drive means of FIG. 1.
Figure 3:
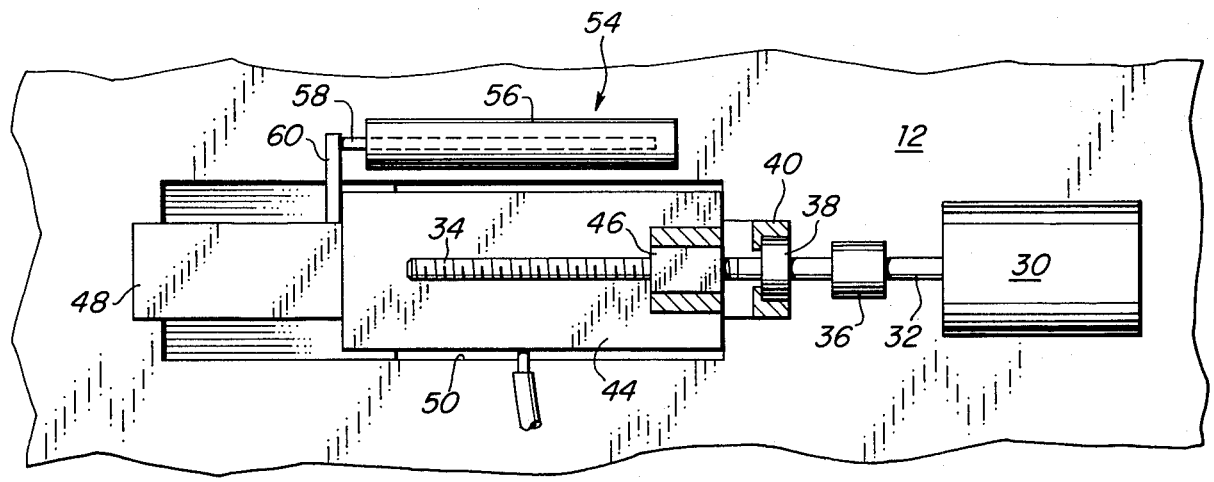
FIG. 3 is a bottom view of the apparatus shown in FIG. 2.

In the embodiment shown in FIGS. 2 and 3, drive means 18 includes motor 30, whose output shaft 32 is engaged with a precision lead screw 34 by means of coupling 36. Support for lead screw 34 is provided by thrust bearing 38 mounted on member 40 extending from base plate 12. The rotation of lead screw 34 is communicated to air bearing 44 by means of drive nut 46. Lead screw 44 and drive nut 46 are included in moving means 16. Air bearing 44 is movable on track 48, which is fixed to base plate 12. Track 48 and air bearing 44 are included in track and bearing means 14. Opening 50 in base plate 12 accommodates interferometer and mount 52, which is fixed to air bearing 44 and is movable for a distance of approximately 10 cm. Typically, air bearing 44 and track 48 engage for at least the same distance as the length of movement called for by the system, in order to maximize the averaging of lack of smoothness or flatness in the track and bearing. The use of precision lead screws 34 and air bearing 44 contribute greatly to the smooth, uniform motion provided by this system. Motor 30, FIGS. 2 and 3, as indicated previously, may include the tachometer which constitutes the velocity sensor 22. LVDT 54 is included in position sensor 20. Cylinder 56 of LVDT 54 is fixed to base plate 12, while armature 58 is attached by member 60 to air bearing 44.

Figure 4:
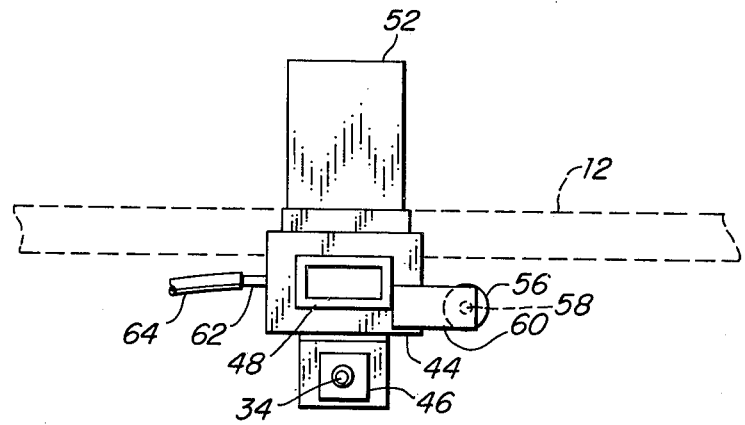
FIG. 4 is an end view of the apparatus shown in FIGS. 2 and 3.

Air bearing 44 receives pressurized air through one or more inlets 62 serviced by lines 64, FIG. 4. As also apparent in FIG. 4, track 48 and air bearing 44 have rectangular cross sections.

Figure 5:
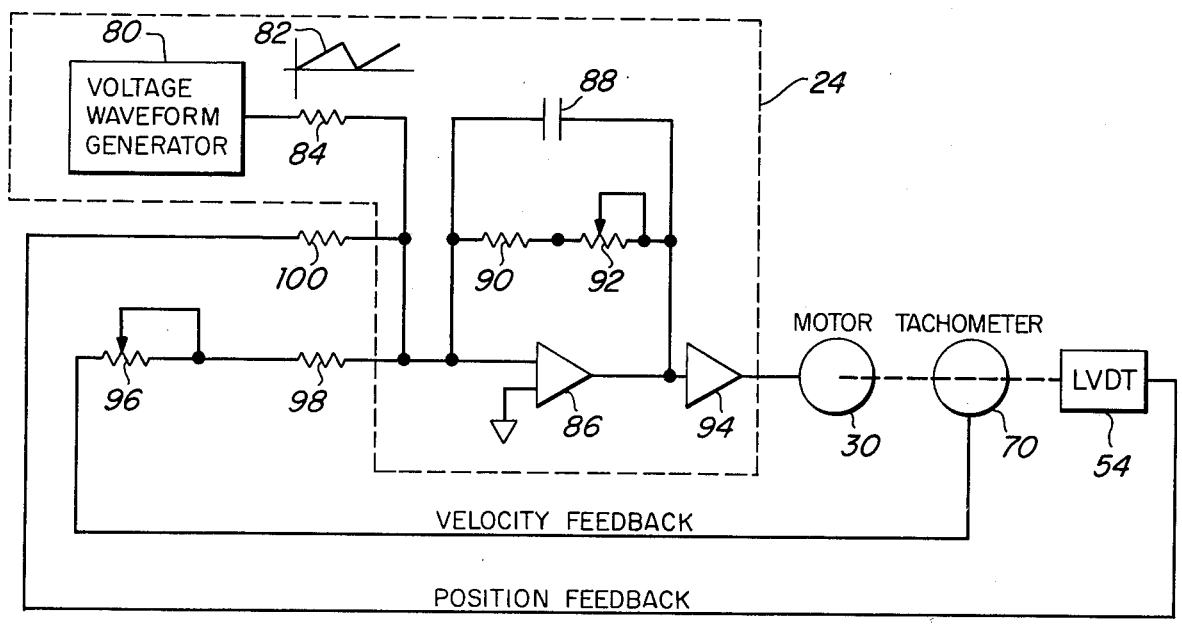
FIG. 5 is a detailed block diagram of the power circuit, velocity and position feedback circuits, and velocity and position sensors as shown in FIG. 1.

Power circuit 24 includes a voltage wave form generator 80, FIG. 5, which provides a sawtooth output 82 through resistor 84 to one input of operational amplifier 86. Capacitor 88 functions to suppress high-frequency signals while resistors 90 and 92 function to control the loop gain of operational amplifier 86. A power amplifier 94 provides the drive current to motor 30. Tachometer 70 included in velocity sensor 22 as indicated previously may be packaged with motor 30. Tachometer 70 provides its output to resistors 96 and 98 in velocity feedback circuit 28, while LVDT 54 provides its output to resistor 100 in position feedback circuit 26.

In operation, the position error voltage fed back through resistor 100, and the drive voltage from waveform generator 80 ideally combine to provide the sum of zero. The output of position sensor LVDT 54 lags the drive voltage from generator 80, and the resulting difference or error signal is amplified to enable motor 30 to drive air bearing 44. The sum of the drive voltage from generator 80, the position sensor voltage from LVDT 54, and the velocity sensor voltage fed back through resistors 96 and 98, ideally equal zero: the velocity indicated by tachometer 70 and scaled by resistors 96 and 98 equals the positional lag between the drive voltage from generator 80 and the output of position sensor LVDT 54. When the velocity as sensed by tachometer 70 overshoots or undershoots, an error signal is fed back which adjusts in the proper direction to return the sum to zero.

Other embodiments will occur to those skilled in the art and are within the following claims:

What is claimed is:

1. A precision drive system comprising:
a baseplate; track means and air bearing means movable relative to one another, one of said means being fixed to said baseplate and the other being movable for carrying an object to be moved relative to the baseplate; precision lead screw means and drive nut means for moving one of said track and air bearing means; an electric servo motor for driving one of said precision lead screw means and drive nut means; and a control circuit including a power circuit for operating said electric servo motor; a tachometer for detecting the velocity of the movable one of said track and air bearing means, and a velocity feedback circuit for introducing velocity error signals into said power circuit; an LVDT to detect the position of the movable one of said track and air bearing means and a position feedback circuit for introducing position error signals to said power circuit, said power circuit including means for generating sawtooth output signals and means for summing said sawtooth output signals with said velocity error signals and said position error signals to provide corrected velocity and position signals for operating said electric servomotor.

2. The precision drive system of claim 1 in which said precision lead screw is engaged with said electric servo motor.

3. The precision drive system of claim 1 in which the length of engagement of said track and bearing means is approximately equal to or greater than the total movement distance.

4. The precision drive system of claim 2 in which said drive nut means is engaged with one of said track or air bearing means.

5. The precision drive system of claim 1 in which said precision lead screw means is engaged with one of said track or air bearing means.

6. The precision drive system of claim 5 in which said drive nut means is engaged with said electric servo motor.

7. The precision drive system of claim 1 in which said tachometer is included in said electric servo motor.

* * * * *